United States Patent
Chow et al.

(10) Patent No.: US 7,133,423 B1
(45) Date of Patent: Nov. 7, 2006

(54) MAINTAINING SYNCHRONIZATION BETWEEN FRAME CONTROL WORD AND DATA FRAME PAIRS IN A HOME NETWORK

(75) Inventors: Peter K. Chow, San Jose, CA (US); Harand Gaspar, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 871 days.

(21) Appl. No.: 09/884,660

(22) Filed: Jun. 19, 2001

(51) Int. Cl.
*H04J 3/06* (2006.01)

(52) U.S. Cl. ...................... 370/504; 370/509

(58) Field of Classification Search ............... 370/445, 370/446, 419, 420, 469, 503, 504, 509
See application file for complete search history.

(56) References Cited

U.S. PATENT DOCUMENTS

| | | | | |
|---|---|---|---|---|
| 5,829,837 A | * | 11/1998 | Reiersen | ..................... 297/352 |
| 6,005,869 A | * | 12/1999 | Sakai et al. | .................. 370/452 |
| 6,711,138 B1 | * | 3/2004 | Pai et al. | ..................... 370/257 |
| 6,747,996 B1 | * | 6/2004 | Holloway et al. | .......... 370/503 |

* cited by examiner

Primary Examiner—Ricky Q. Ngo
Assistant Examiner—Richard Chang
(74) Attorney, Agent, or Firm—Winstead Sechrest & Minick P.C.

(57) ABSTRACT

A method and system for maintaining synchronization in a home network is disclosed. The home network includes a host ethernet media access controller and an HPNA chip, where control frame and data frame pairs are transferred between the host ethernet media access controller (MAC) and the HPNA chip. The method and system include sending a null frame from the host ethernet MAC to the HPNA chip prior to the data frame, and recognizing the null frame on the HPNA chip as an indication that a next received frame will be the data frame, thereby maintaining synchronization between the control frame and the data frame pairs.

25 Claims, 2 Drawing Sheets

MAINTAINING SYNCHRONIZATION BETWEEN FRAME CONTROL WORD AND DATA FRAME PAIRS IN A HOME NETWORK

FIELD OF THE INVENTION

The present invention relates to home networks, and more particularly to a method and system for maintaining synchronization between the control frame and data frame pairs.

BACKGROUND OF THE INVENTION

HomePNA or HPNA is a de facto home networking standard developed by the Home Phoneline Networking Alliance. HPNA allows all the components of a home network to interact over the home's existing telephone wiring without disrupting voice capability. In the same way a LAN operates, home networking processes, manages, transports and stores information, which enables disparate devices in a home network such as telephones, fax machines, desktops, laptops, printers, scanners and Web cameras to connect and integrate over an existing wiring topology.

To create the home network, personal computers may be equipped with an HPNA network and HPNA software. An HPNA network may be implemented as an internal PC network interface card (NICs) that includes telephone jacks on the back for connection to the network. An HPNA network may also be implemented in an external USB adapter that plugs into the USB port on the PC on one end, while the other end connects to the phone line at the wall jack. Additionally, an HPNA network may be implemented as part of the chipset or ACR (Advanced Communications Riser).

FIG. 1 illustrates an embodiment of a home phone line network that complies with the Home Phoneline Networking Alliance (HPNA) specification version 2.0. The network allows multiple computers to communicate through telephone wires of residential homes. The network includes an application program running on the PC called a host ethernet media access controller (MAC) 112, and an HPNA chip 100 for implementing the HPNA 2.0 specification, which is included on a network interface card. The HPNA chip 100 includes a Media Independent Interface (MII) 106, a Media access controller (MAC) 108, and a Physical Layer (PHY) 110.

The host ethernet MAC 112 sends frames of data packets out over the home network, and receives frames of data packets from the network, through the HPNA chip 100. The HPNA chip 100 communicates with an analog front end (AFE) 104 that processes signals between the chip 100 and the transmission channel, which in this case are the telephone wires of the house that are accessed via a phone jack 102. The AFE 104 converts outgoing digital signals into analog signals, and converts incoming analog signals into digital signals.

HomePNA 10M8 provides for a wide range of bit rates ranging from 4 Mb/s to 32 Mb/s. When receiving data off the wire, the HPNA chip 100 can never fall behind the maximum arrival rate of new packet data. When transmitting data from the host ethernet MAC 112 to the HPNA chip 100, however, it is possible for the host ethernet MAC 112 to fall into an underflow condition, which causes the host ethernet MAC 112 and the HPNA chip 100 to become unsynchronized when transferring frames of packets. More specifically, when transmitting data to the HPNA chip 100, the host ethernet MAC 112 transmits a control frame followed by an Ethernet data frame. During an underflow condition, the HPNA chip 100 may encounter situations where the control frames become unsynchronized with the data frames, hampering network reliability and performance.

Accordingly, what is needed is a method and system for maintaining synchronization between the control frame and data frame pairs between the host ethernet MAC and HPNA chip. The present invention addresses such a need.

SUMMARY OF THE INVENTION

The present invention provides a method and system for maintaining synchronization in a home network. The home phone network includes a host ethernet media access controller (MAC) and an HPNA chip, where control frame and data frame pairs are transferred between the host ethernet media access controller (MAC) and the HPNA chip. The method and system include sending a null frame from the host ethernet MAC to the HPNA MAC chip prior to the data frame, and recognizing the null frame on the HPNA chip as an indication that a next received frame will be the data frame, thereby maintaining synchronization between the control frame and the data frame pairs.

DETAILED DESCRIPTION

The present invention relates to synchronizing data sent between a host ethernet MAC and an HPNA chip in an HPNA network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
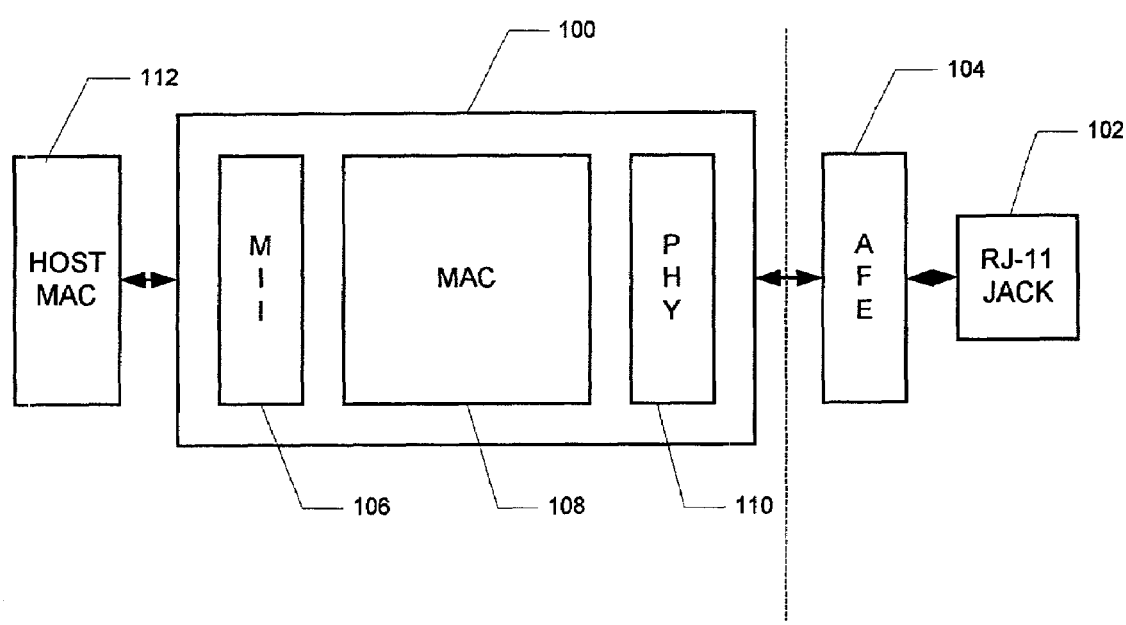
FIG. 1 illustrates an embodiment of a home phone line network that complies with the Home Phoneline Networking Alliance (HPNA) specification version 2.0.

Referring to FIG. 1, the Media Independent Interface (MII) 106 is a common interface found on many pieces of existing networking silicon, as specified in IEEE Std 802.3-1998, clause 22. Flow control is a major issue in using the MII interface. The MII specification calls for interface clock frequency of up to 25 MHz, resulting in a data transfer rate of 100 Mb/s. HomePNA 10M8 provides for a wide range of bit rates ranging from 4 Mb/s to 32 Mb/s. For the PHY-to-MAC (receive) direction there is no problem since the MII interface can never fall behind the maximum arrival rate of new packet data off the wire.

Figure 2:
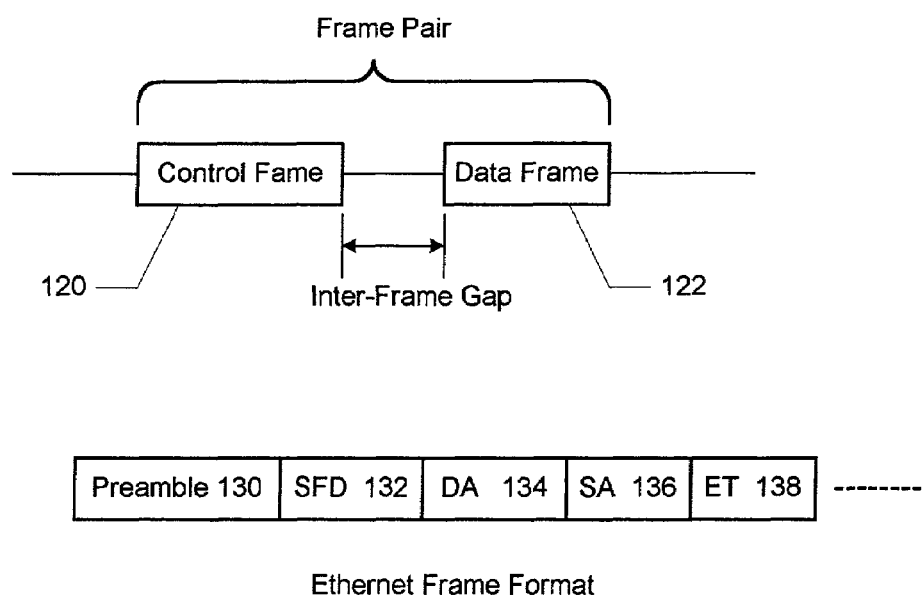
FIG. 2 is a block diagram illustrating frame transfer sequences between the host ethernet MAC and the HPNA chip.

FIG. 2 is a block diagram illustrating a frame transfer sequence between the host ethernet MAC 112 and the HPNA chip 100. Frames are transferred between the host ethernet MAC 112 and the MII 106 transmits frames in pairs. During a frame transmit (TX) sequence, the host ethernet MAC 112 transmits a control frame 120 containing a frame control word (FCW) followed by a data frame 122 separated by a minimum interframe gap. During a frame receive (RX) sequence, the MII 106 transmits a frame control 120 containing a frame status word (FSW) after the data frame 122.

In a preferred embodiment, the control frame 120 and the data frame 122 each include a standard Link-level Ethernet Frame, as described in IEEE Std 802.3. As shown, at the PHY level, an Ethernet Frame includes, a preamble field 130, a start-frame-delimiter (SFD) field 132, a destination address (DA) field 134, a source address (SA) field 136, and an ethernet type (ET) field 138. The Destination Address (DA) and Source Address (SA) contain IEEE assigned Ethernet MAC addresses.

Because the MII106 does not support transferring any real-time control information with each data frame 122, the control frames 120 may become unsynchronized with their data frames 122 during an underflow condition.

Figure 3:
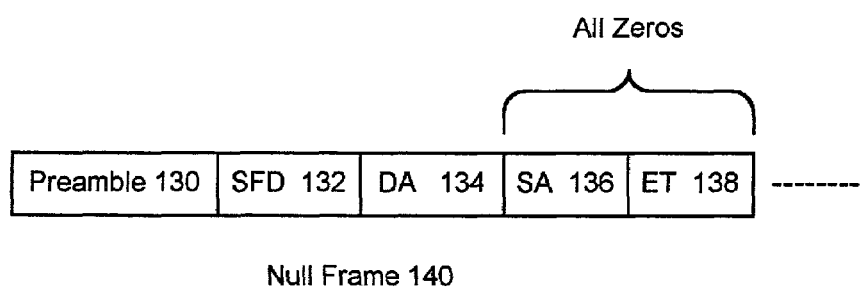
FIG. 3 is a diagram illustrating a null frame that is sent prior to the data frame to communicate signaling information between the host ethernet MAC and the HPNA chip in accordance with the present invention.

The present invention provides method and system for maintaining synchronization between the control frame 120 and data frame 122 pairs between the host ethernet MAC and the MII 106, as shown in FIG. 3.

FIG. 3 is a diagram illustrating a null frame 140, which in accordance with the present invention, is sent prior to the data frame 122 to communicate signaling information between the host ethernet MAC 112 and the HPNA chip 100. The null frame 140 is a control frame that has an invalid address inserted into the source address (SA) 136 and the Ethernet type (ET) 138. Upon receiving the null frame 140, the HPNA chip 100 recognizes the null frame 140 as an indication that a next received frame will be a data frame 122, thereby maintaining synchronization between the control frame 120 and the data frame 122 pairs.

In a preferred embodiment, the invalid address in the null frame 140 is all zeros, and the null frame 140 is a minimum size frame (64 bytes). During the receive sequence where the HPNA chip 100 receives frames off of the wire, the destination address should be the destination address (DA) 134 of the corresponding received frame.

For the transmit sequence, the host ethernet MAC 112 will issue a minimum size null frame 140 containing FCW prior to the data frame 122. Although this frame is an ordinary Ethernet (null) frame, the HPNA chip 100 will recognize the null frame 140 by the all zeros in the source address (SA) 136 and Ethernet type (ET) 138, and decode its control information to set up the MII 106 for the coming data frame 122.

For the receive sequence, the HPNA chip 100 will issue a minimum size null frame 140 containing FSW after the data frame 122. The host ethernet MAC 112 uses the information in the FSW to complete further protocol processing, including rate negotiation, and statistics, and frame handling.

In operation, the host ethernet MAC 112 asserts a transmit enable signal (TX_EN) during transmission of the control frame. When the MII 106 detects the transmit enable signal, the MII 106 checks a start frame delimiter SFD 132 in the null control frame 140 and also checks that the transmit enable signal is still asserted. If both are true, the MII 106 checks the frame control word (FCW) in the null control frame 140 and waits for the transmit enable signal to become inactive. Once the transmit enable signal becomes inactive, the MII 106 checks for an end of frame control word that signals the end of the control frame.

Once the end of the null control frame 140 is detected, the MII 106 checks for all zeros in the source address (SA) 136 and the Ethernet type (ET) 138. If true, the null control frame 140 is saved and the MII 106 waits for the interframe gap indicating the data frame 122 from the host ethernet MAC 112. If the MII 106 does not include all zeros in the source address (SA) 136 and the Ethernet type (ET) 138, then the MII 106 discards the frame and returns to the idle state, waiting for another transmit enable signal.

A method and system for maintaining synchronization between the control frame and data frame 122 pairs between the host ethernet MAC 112 and HPNA chip 100 has been disclosed, where a null Ethernet frame 140 is used to communicate real-time information between the host ethernet MAC 112 and the HPNA chip 100.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for maintaining synchronization in a home network that includes a host Ethernet media controller and an HPNA chip, where control frame and data frame pairs are transferred between the host Ethernet media access controller (MAC) and the HPNA chip, the method comprising the steps of:
   (a) sending a null frame from the host Ethernet MAC to the HPNA chip prior to the data frame; and
   (b) recognizing the null frame on the HPNA chip as an indication that a next received frame will be the data frame, thereby maintaining synchronization between the control frame and the data frame pairs.

2. A method for maintaining synchronization in a home network that includes a host Ethernet media controller and an HPNA chip, where control frame and data frame pairs are transferred between the host Ethernet media access controller (MAC) and the HPNA chip, the method comprising the steps of:
   (a) sending a null frame from the host Ethernet MAC to the HPNA chip prior to the data frame; and
   (b) recognizing the null frame on the HPNA chip as an indication that a next received frame will be the data frame, thereby maintaining synchronization between the control frame and the data frame pairs;
   wherein the null frame includes a source address field and an Ethernet type field, step (a) further including the step of providing an invalid address in the source address field and the Ethernet type field.

3. The method of claim 2 wherein step (a) further includes the step of providing all-zeros in the source address field and the Ethernet type field.

4. The method of claim 2 wherein step (a) further includes the step of providing the null frame as a minimum size Ethernet frame.

5. The method of claim 2 wherein step (a) further includes the step of issuing from the host Ethernet MAC a minimum size frame containing a frame control word prior to the data frame during a transmit sequence.

6. The method of claim 2 wherein step (a) further includes the step of issuing from the HPNA chip a minimum size frame containing a frame status word with the data frame during a receive sequence.

7. The method of claim 2 wherein the null frame further includes a destination address field, step (a) further including the step of providing the destination address with a destination address of a corresponding frame received during a receive sequence.

8. A system for maintaining synchronization in a home network that includes a host Ethernet media access controller and an HPNA chip, wherein control frame and data frame pairs are transferred between the host Ethernet media access controller (MAC) and the HPNA chip, the system comprising:
(a) means for sending a null frame from the host Ethernet MAC to the HPNA chip prior to the data frame; and
(b) means for recognizing the null frame on the HPNA chip as an indication that a next received frame will be the data frame, thereby maintaining synchronization between the control frame and the data frame pairs.

9. A system for maintaining synchronization in a home network that includes a host Ethernet media access controller and an HPNA chip, wherein control frame and data frame pairs are transferred between the host Ethernet media access controller (MAC) and the HPNA chip, the system comprising:
(a) means for sending a null frame from the host Ethernet MAC to the HPNA chip prior to the data frame; and
(b) means for recognizing the null frame on the HPNA chip as an indication that a next received frame will be the data frame, thereby maintaining synchronization between the control frame and the data frame pairs;
wherein the null frame includes a source address field and an Ethernet type field that contains an invalid address.

10. The system of claim 9 wherein the source address field and the Ethernet type field contain all-zeros.

11. The system of claim 9 wherein the null frame comprises a minimum size Ethernet frame.

12. The system of claim 9 wherein the host Ethernet MAC issues a minimum size frame containing a frame control word prior to the data frame during a transmit sequence.

13. The system of claim 9 wherein the HPNA chip issues a minimum size frame containing a frame status word with the data frame during a receive sequence.

14. The system of claim 9 wherein the null frame further includes a destination address field that contains a destination address of a corresponding frame received during a receive sequence.

15. A method for maintaining synchronization in a home network that includes a host Ethernet media access controller program and media interface of an HPNA chip, where control frame and data frame pairs are transferred between the host Ethernet media access controller (MAC) and the HPNA chip, the method comprising the steps of:
(a) sending a null frame having a source address field and an Ethernet type field from the host Ethernet MAC to the media interface prior to the data frame, wherein the source address field and the Ethernet type field in the null frame include all zeros; and
(b) in response to receiving the null frame by the media interface, recognizing the zeros in the source address field and the Ethernet type field as an indication that a next received frame will be the data frame, thereby maintaining synchronization between the control frame and the data frame pairs.

16. The method of claim 15 wherein step (a) further includes the step of providing the null frame as a minimum size Ethernet frame.

17. The method of claim 16 wherein step (a) further includes the step of issuing from the host Ethernet MAC the null frame containing a frame control word prior to the data frame during a transmit sequence.

18. The method of claim 17 wherein step (a) further includes the step of issuing from the HPNA chip the null frame containing a frame status word with the data frame during a receive sequence.

19. The method of claim 18 wherein the null frame further includes a destination address field, step (a) further including the step of providing the destination address with a destination address of a corresponding frame received during a receive sequence.

20. A home network, comprising:
a host Ethernet media access controller (MAC);
an HPNA chip having a media interface in communication with the host Ethernet MAC; and
control frame and data frame pairs transferred between the host Ethernet MAC and the HPNA chip, wherein the control frame includes a source address field and an Ethernet type field,
wherein synchronicity is maintained between the control frame and data frame pairs by placing an invalid address in the source address field and the Ethernet type field of the control frame, such that the invalid address indicates to a receiver of the control frame that a next received frame will be the data frame.

21. The system of claim 20 wherein the invalid address comprises all zeros.

22. The system of claim 20 wherein the null frame comprises a minimum size Ethernet frame.

23. The system of claim 21 wherein the host Ethernet MAC issues a minimum size frame containing a frame control word prior to the data frame during a transmit sequence.

24. The system of claim 22 wherein the HPNA chip issues a minimum size frame containing a frame status word with the data frame during a receive sequence.

25. The system of claim 23 wherein the null frame further includes a destination address field that contains a destination address of a corresponding frame received during a receive sequence.

* * * * *